US008194881B2

(12) United States Patent
Haulick et al.

(10) Patent No.: US 8,194,881 B2
(45) Date of Patent: Jun. 5, 2012

(54) DETECTION AND SUPPRESSION OF WIND NOISE IN MICROPHONE SIGNALS

(75) Inventors: Tim Haulick, Blaubeuren (DE); Markus Buck, Biberach (DE); Phillip A. Hetherington, Port Moidy (CA); Klaus Haindl, Vienna (AT)

(73) Assignee: Nuance Communications, Inc., Burlington, MA (US)

( * ) Notice: Subject to any disclaimer, the term of this patent is extended or adjusted under 35 U.S.C. 154(b) by 1140 days.

(21) Appl. No.: 11/925,323

(22) Filed: Oct. 26, 2007

(65) Prior Publication Data

US 2008/0226098 A1 Sep. 18, 2008

Related U.S. Application Data

(63) Continuation-in-part of application No. PCT/EP2006/001288, filed on Feb. 13, 2006.

(51) Int. Cl.

| | |
|---|---|
| ***H04B 15/00*** | (2006.01) |
| ***H04R 3/00*** | (2006.01) |
| ***H04R 25/00*** | (2006.01) |

(52) U.S. Cl. ..................... 381/94.1; 381/94.9; 381/94.2; 381/94.3; 381/92; 381/122; 381/313; 381/317

(58) Field of Classification Search .................. 381/312, 381/313, 316, 317, 92, 94.3, 94.7, 94.9, 122
See application file for complete search history.

(56) References Cited

U.S. PATENT DOCUMENTS

| | | | | |
|---|---|---|---|---|
| 4,420,655 | A | 12/1983 | Suzuki et al. | |
| 5,058,171 | A | 10/1991 | Wurzer et al. | |
| 5,524,056 | A * | 6/1996 | Killion et al. | 381/314 |
| 6,243,003 | B1 * | 6/2001 | DeLine et al. | 340/425.5 |
| 2002/0037088 | A1 | 3/2002 | Dickel et al. | |
| 2003/0147539 | A1 * | 8/2003 | Elko et al. | 381/92 |
| 2004/0185804 | A1 | 9/2004 | Kanamori et al. | |
| 2005/0041825 | A1 | 2/2005 | Rasmussen et al. | |

FOREIGN PATENT DOCUMENTS

| | | | |
|---|---|---|---|
| EP | 1 078 818 | A2 | 2/2001 |
| EP | 1 078 818 | A3 | 5/2003 |
| WO | WO 00/21194 | A | 4/2000 |
| WO | WO 02/065735 | A2 | 8/2002 |
| WO | WO 02/065735 | A3 | 8/2002 |

* cited by examiner

*Primary Examiner* — Devona Faulk
*Assistant Examiner* — George Monikang
(74) *Attorney, Agent, or Firm* — Sunstein Kann Murphy & Timbers LLP

(57) ABSTRACT

To reliably and consistently detect desirable sounds, a system detects the presence of wind noise based on the power levels of audio signals. A first transducer detects sound originating from a first direction and a second transducer detects sound originating from a second direction. The power levels of the sound are compared. When the power level of the sound received from the second transducer is less than the power level of the sound received from the first transducer by a predetermined value, wind noise may be present. A signal processor may generate an output from one or a combination of the audio signals, based on a wind noise detection.

21 Claims, 7 Drawing Sheets

DETECTION AND SUPPRESSION OF WIND NOISE IN MICROPHONE SIGNALS

PRIORITY CLAIM

This application is a continuation-in-part of co-pending international patent application PCT/EP2006/001288, filed on Feb. 13, 2006 and designating the United States, which claims the benefit of priority from European Patent Application No. 05009470.5, filed Apr. 29, 2005, both of which are incorporated by reference.

BACKGROUND OF THE INVENTION

1. Technical Field

The inventions relate to noise detection and reduction, and in particular, to wind noise detection and reduction.

2. Related Art

Microphones may detect and convert sound to an electrical signal. Microphones may detect desirable sounds, such as speech, music, or other audio. For example, in a vehicle, a hands-free telephone system or speech recognition system may include a microphone. However, microphones may also detect undesirable sounds, such as wind noise and vibrations, which may mask or distort the desirable sounds. Undesirable sounds may be caused by natural air flow, air flow from a climate control system, or other sources.

Some microphones may detect sound originating from a specific direction. Other microphones may detect sound traveling in many directions. Directional microphones may detect fewer undesirable sounds if they are not directed towards the sources of the undesirable sounds. However, compared to omnidirectional microphones, directional microphones may be significantly more sensitive to undesirable sounds if they are directed towards sources of the undesirable sounds. Some directional microphones may reduce sensitivity to undesirable sounds by isolating these sounds through physical barriers. However, using such physical barriers may reduce the performance of a directional microphone.

SUMMARY

A system detects the presence of wind noise based on the power levels of audio signals received at transducers. A first transducer detects sound originating from a first direction and a second transducer detects sound originating from another direction. If the power level from the second transducer is less than the power level from the first transducer by a predetermined value, wind noise may be detected. A signal processor may generate an output signal from one or a combination of the audio signals, based on a wind noise detection.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A system detects wind noise by monitoring the power levels of audio signals received from multiple transducers. A first transducer detects sound originating from a specific direction and a second transducer detects sound originating from another direction. The power levels of the audio signals from the transducers are compared. If the power level from the second transducer is less than the power level from the first transducer by a predetermined value, wind noise may be detected. A signal processor may generate an output signal from one of the audio signals, or a combination of the audio signals, based on whether wind noise is detected. The output signal may substantially suppress wind noise in the detected sound.

If the combination of audio signals generates the output signal, the output signal may include a portion of the first transducer audio signal above a predetermined frequency and a portion of the second transducer audio signal below the predetermined frequency. Alternatively, the signal processor may calculate a threshold frequency. In this case, the threshold frequency may ensure that the second transducer power level is not less than the first transducer power level by the predetermined value, for frequencies above the threshold frequency. In addition, the output signal may be a combination of the first audio signal for frequencies above the threshold frequency and the second audio signal for frequencies below the threshold frequency. When using the threshold frequency, the output signal may include phase values of the second transducer audio signal and amplitude values from first and second transducer audio signals. Multiple microphones of varying types may be used in the system. A beamformer may combine the audio signals from the microphones.

Figure 1:
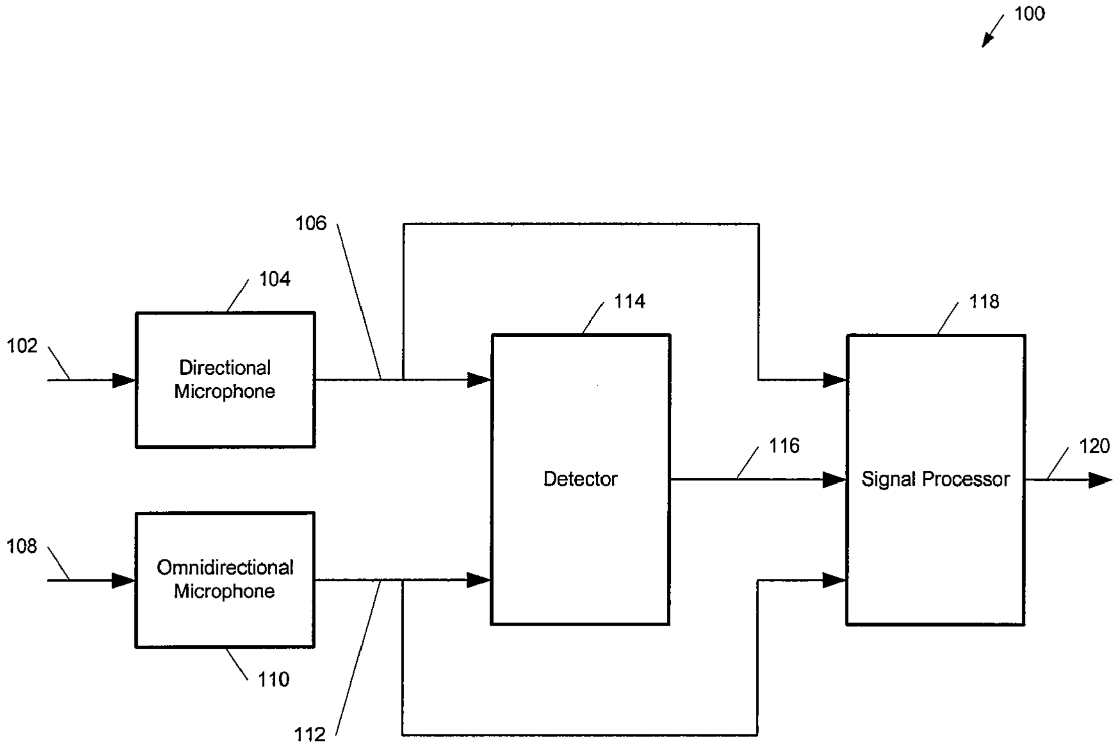
FIG. 1 is a wind noise suppression system.

FIG. 1 is a wind noise suppression system 100. The wind noise suppression system 100 may detect sounds through a first and a second transducer, detect the presence of wind noise in the audio signals corresponding to the sounds, and generate an output signal comprising one or a combination of the audio signals. A first sound 102 may be detected by a directional microphone 104 and converted to a first audio signal 106. A second sound 108 may be detected by an omnidirectional microphone 110 and converted to a second audio signal 112. The directional microphone 104 and omnidirectional microphone 110 may have different directivity indices. The directivity index is the log ratio of the power delivered by an omnidirectional microphone to that of a directional microphone with equal or almost equal sensitivity in a certain direction, in a diffuse sound field. The directional microphone 104 may detect sound originating from a certain direction. The directional microphone 104 may have a non-zero directivity index of approximately 4.8 dB and have a cardioid or dipole polar sensitivity pattern. In contrast, the omnidirectional microphone 110 may have a directivity index of approximately 0 dB and have a circular polar sensitivity pattern. The omnidirectional microphone 110 may be relatively insensitive to wind noise compared to the directional microphone 104. The directional microphone 104 and the omnidirectional microphone 110 may be positioned in a common housing or may be positioned apart. More than one directional or omnidirectional microphone or other types of microphones may be included in the system 100.

The first and second audio signals 106 and 112 may have a first and second power level, respectively. A detector 114 may compare the first and second power levels and generate a detection signal 116. If the second power level is less than the first power level by a predetermined value, the detection signal 116 may indicate presence of wind noise. If the second power level is not less than the first power level by the predetermined value, the detection signal 116 may indicate absence of wind noise. Wind noise may be present when the second audio signal of the omnidirectional microphone 110 has a lower power level by the predetermined value than the first audio signal of the directional microphone 104. The predetermined value may be associated with a range where wind noise significantly deteriorates the first and second audio signals 106 and 112. If the second power level is less than the first power level, a predetermined value may be close to zero. The detection signal 116 may indicate the presence of wind noise if the second power level is less than the first power level. The predetermined value may be selected empirically and/or may be based on theoretical calculations. A user may also select the predetermined value from several value options to manually control the sensitivity of the wind suppression system 100.

The detection signal 116 may be coupled to a signal processor 118. The signal processor 118 may produce an output signal 120 depending on the detection signal 116. The output signal 120 may be generated from the first audio signal 106 or the second audio signal 112. If the detection signal 116 indicates the presence of wind noise, the output signal 120 may be generated from the second audio signal 112 detected by the omnidirectional microphone 110. In this case, the output signal 120 may include the second audio signal 112 because the first audio signal 106 may be deteriorated by wind noise. However, if the detection signal 116 indicates the absence of wind noise, the output signal 120 may be generated from the first audio signal 106 detected by the directional microphone 104. In this case, the output signal 120 may include the first audio signal 106 because the directional microphone 104 has a higher quality signal due to its higher directivity index. Also, there is little or no deterioration of the first audio signal 106. The output signal 120 may be coupled to a speech recognition system, a speech-to-text system, a cellular phone, and/or other component that can utilize the output signal 120.

Alternatively, the signal processor 118 may generate the output signal 120 from a combination of the first and second audio signals 106 and 112, based on a predetermined frequency. If the detection signal 116 indicates the presence of wind noise, the output signal 120 may include a portion of the first audio signal 106 above the predetermined frequency and a portion of the second audio signal 112 below the predetermined frequency. The output signal 120 may include higher frequencies from the directional microphone 104, and lower frequencies from the omnidirectional microphone 110. Because wind noise tends to affect lower frequencies, the second audio signal 112 may be used for frequencies below the predetermined frequency. The predetermined frequency may be approximately 500 Hz, for example, or may be another frequency.

In an alternative system, the signal processor 118 may generate the output signal 120 from a combination of the first and second audio signals 106 and 112, based on a calculated threshold frequency. If the detection signal 116 indicates the presence of wind noise, the output signal 120 may include a portion of the first audio signal 106 that is above the threshold frequency and a portion of the second audio signal 112 that is below the threshold frequency. The threshold frequency may be based on the first and second power levels of the first and second audio signals 106 and 112. The threshold frequency may ensure that the second power level is not less than the first power level by the predetermined value, for frequencies above the calculated threshold frequency. In this system, the higher quality first audio signal 106 from the directional microphone 104 may be used in frequencies above the calculated threshold frequency. In these higher frequencies, wind noise may have less effect and the higher directivity index directional microphone 104 may be used. Similarly, the second audio signal 112 from the omnidirectional microphone 110 may be used in frequencies below the calculated threshold frequency. Because wind noise has more effect in lower frequencies, the lower directivity index omnidirectional microphone 110 may be used. In addition, the phase and amplitude value of the first and second audio signals 106 and 112 may be analyzed and processed to generate the output signal 120 in frequencies below the threshold frequency. The threshold frequency may be calculated to be within a range of approximately 500 Hz to approximately 1000 Hz, for example.

The signal processor 118 may process the first and second audio signals 106 and 112 as analog signals, as digital signals following an analog-to-digital conversion, in the time domain, in the frequency domain, and/or in the subband domain. The signal processor 118 may include discrete and/or integrated components, and may include passive and/or active elements to process the first and second audio signals 106 and 112, and the detection signal 116.

Figure 2:
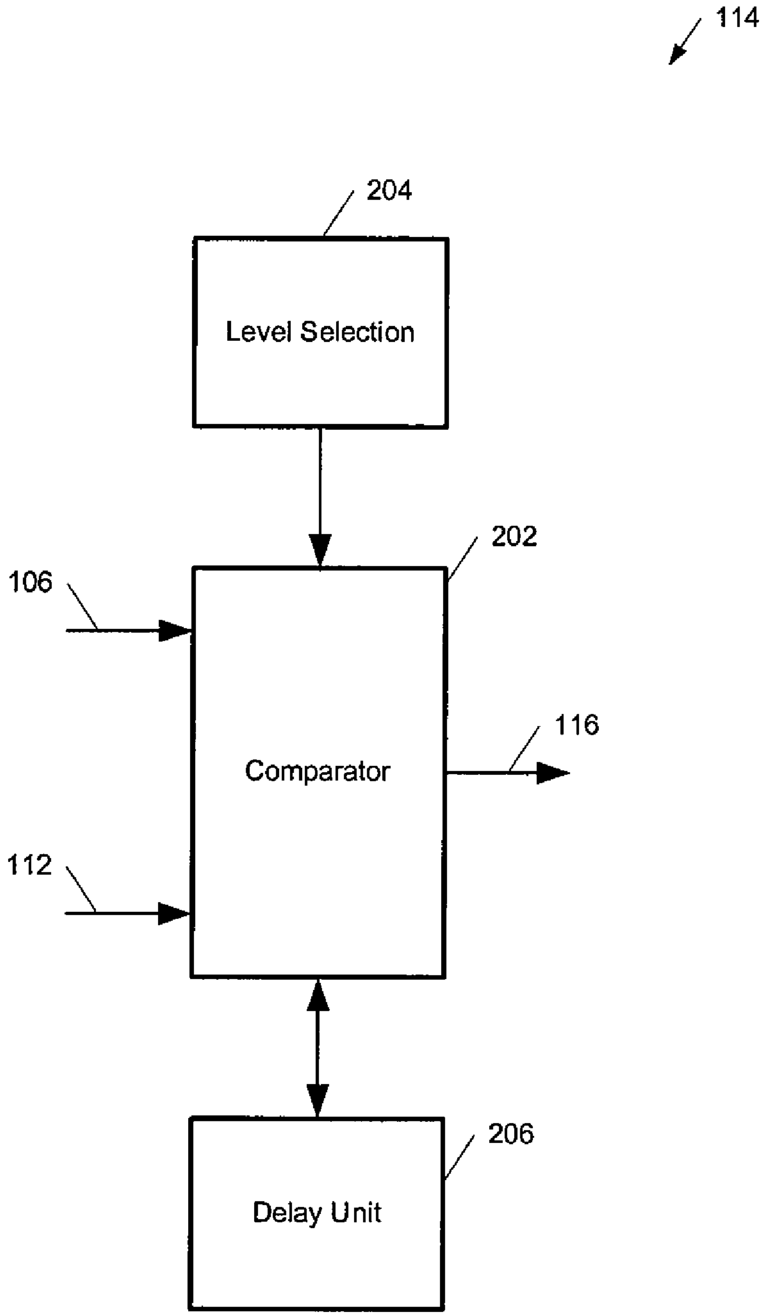
FIG. 2 is a detector in the wind noise suppression system.

FIG. 2 is the detector 114 in the wind noise suppression system 100. A comparator 202 may compare the first power level of the first audio signal 106 with the second power level of the second audio signal 112. The comparator 202 may be a circuit for performing amplitude selection between either two variables or between a variable and a constant. The detection signal 116 may be generated by the comparator 202 to indicate the presence or absence of wind noise. If the second power level is less than the first power level by a predetermined value, the detection signal 116 may indicate presence of wind noise. If the second power level is not less than the first power level by the predetermined value, the detection signal 116 may indicate absence of wind noise. Therefore, when the second audio signal of the omnidirectional microphone 110 has a lower power level by the predetermined value than the first audio signal of the directional microphone 104, wind noise may be detected. The predetermined value may be selected empirically and/or calculated theoretically. The predetermined value may be in a range where wind noise significantly deteriorates the first and second audio signals 106 and 112. For example, the predetermined value may be close to zero, such that the detection signal 116 indicates the presence of wind noise if the second power level is less than the first power level.

A level selection unit 204 may be included in the detector 114. The level selection unit 204 may allow a user to select the predetermined value from several value options to manually control the sensitivity of the wind suppression system 100. The level selection unit 204 may also automatically and dynamically select the predetermined value based on a characteristic of the wind suppression system 100. The level selection unit 204 may be programmable by a controller, microprocessor, or other logic to select the predetermined value. The detector 114 may also include a delay unit 206. The delay unit 206 may keep the detection signal 116 constant for a predetermined time period if a change in the detection signal 116 is about to occur. The delay for the predetermined time period may be desirable to avoid artifacts in the output signal 120 caused by abrupt changes in the detection signal 116. For example, the detection signal 116 may initially indicate the absence of wind noise. In time, wind noise may be detected. In this case, the delay unit 206 may maintain the detection signal 116 to indicate the absence of wind noise for a predetermined time period before changing to indicate the presence of wind noise.

Figure 3:
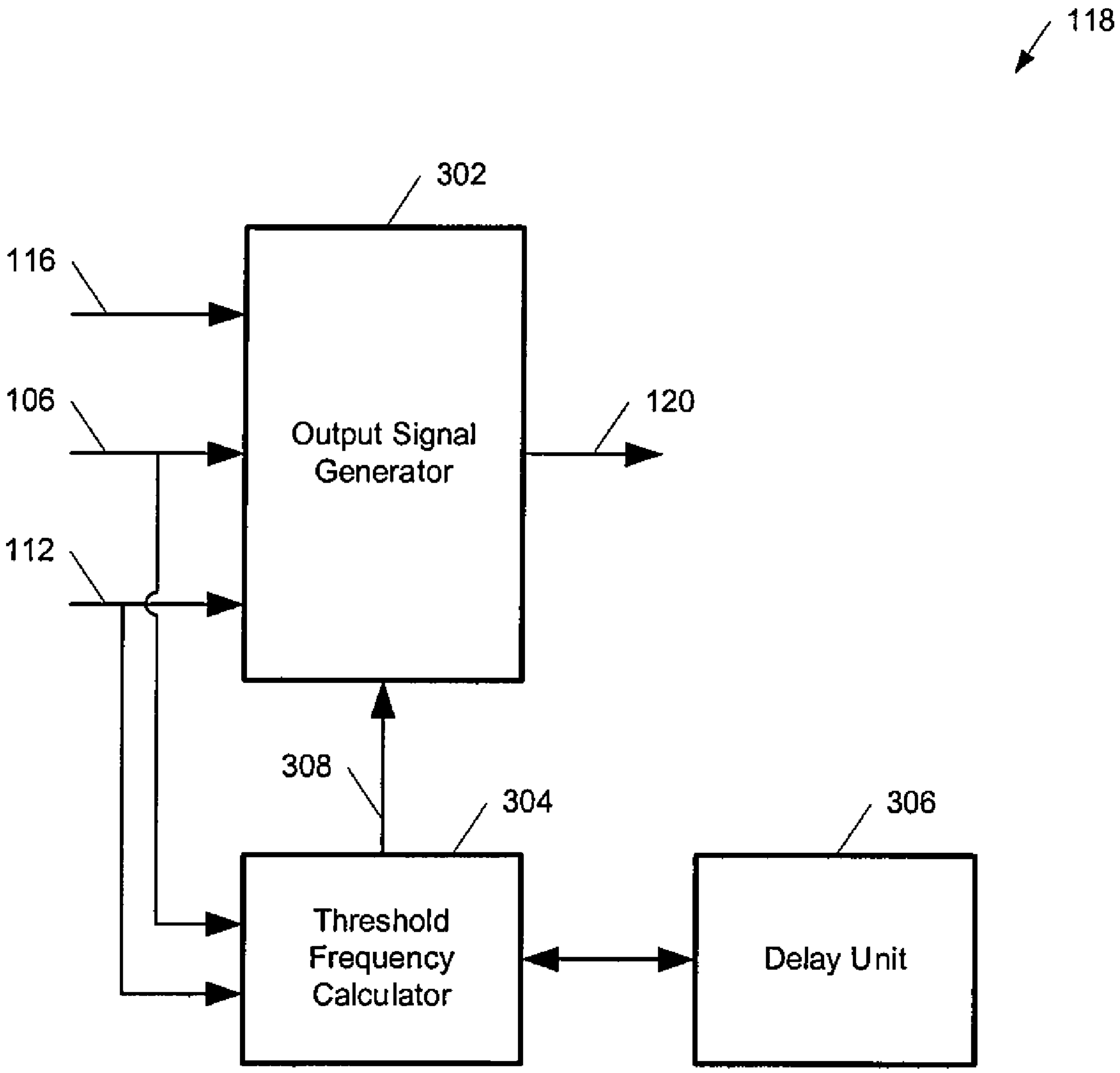
FIG. 3 is a signal processor in the wind noise suppression system.

FIG. 3 is the signal processor 118 in the wind noise suppression system 100. An output signal generator 302 may generate the output signal 120 based on the detection signal 116 and the first and second audio signals 106 and 112. The output signal 120 may be generated from the first audio signal 106, the second audio signal 112, or a combination of the first and second audio signals 106 and 112. For example, if the detection signal 116 indicates the presence of wind noise, the output signal 120 may be generated from the second audio signal 112 detected by the omnidirectional microphone 110. The output signal 120 may include the second audio signal 112 because the first audio signal 106 may be deteriorated by wind noise. In addition, the second audio signal 112 is may be less sensitive to wind noise because of the lower directivity index of the omnidirectional microphone 110. However, if the detection signal 116 indicates the absence of wind noise, the output signal 120 may be generated from the first audio signal 106 detected by the directional microphone 104. The output signal 120 may include the first audio signal 106 because the directional microphone 104 has a higher quality signal due to its higher directivity index. When the detection signal 116 changes from indicating the absence of wind noise to the presence of wind noise, the output signal 120 may not change abruptly from the first audio signal 106 to the second audio signal 112, or vice versa. Instead, the source of the output signal 120 may change or gradually transition after a predetermined time period.

Alternatively, the output signal generator 302 may generate the output signal 120 from a combination of the first and second audio signals 106 and 112, based on a predetermined frequency. If the detection signal 116 indicates the presence of wind noise, the output signal 120 may include a portion of the first audio signal 106 that is above the predetermined frequency and a portion of the second audio signal 112 that is below the predetermined frequency. The output signal 120 may include higher frequencies from the directional microphone 104, and lower frequencies from the omnidirectional microphone 110. Because wind noise tends to affect lower frequencies, the second audio signal 112 from the omnidirectional microphone 110 may be used to mitigate the effects of the wind noise. The predetermined frequency may be approximately 500 Hz, for example, or may be programmed to another frequency. The output signal generator 302 may generate the output signal 120 from a combination of the first and second audio signals 106 and 112 if no detection signal 116 is output by the detector 114. The first and second audio signals 106 and 112 may be combined to obtain an output signal 120 with a higher quality. The output signal 120 may include a portion of the first audio signal 106 that is above the predetermined frequency and a portion of the second audio signal 112 that is below the predetermined frequency.

In another alternative system, the output signal generator 302 may generate the output signal 120 from a combination of the first and second audio signals 106 and 112, based on a threshold frequency 308 established by a threshold frequency calculator 304. If the detection signal 116 indicates the presence of wind noise, the output signal 120 may include or blend a portion of the first audio signal 106 that is above the threshold frequency 308 and a portion of the second audio signal 112 that is below the threshold frequency 308. The threshold frequency 308 may be based on the first and second power levels of the first and second audio signals 106 and 112. The threshold frequency 308 may ensure that the second power level is not less than the first power level by the predetermined value, for frequencies above the threshold frequency 308. The threshold frequency 308 may lie within a range of approximately 500 Hz to approximately 1000 Hz, for example. The calculation of the threshold frequency 308 may be time-dependent and change dynamically, depending on the power level differences between the first and second audio signals 106 and 112.

The higher quality first audio signal 106 from the directional microphone 104 may be selected when frequencies lie above the threshold frequency 308. In these higher frequencies, wind noise may have less effect and the higher directivity index directional microphone 104 may be used. Similarly, the second audio signal 112 from the omnidirectional microphone 110 may be selected when frequencies lie below the threshold frequency 308. Because wind noise may have more effect in lower frequencies, the lower directivity index omnidirectional microphone 110 may be used.

The phase and amplitude values of the first and second audio signals 106 and 112 may be analyzed and processed to generate the output signal 120 in frequencies below the threshold frequency 308. Complex spectrograms of the first and second audio signals 106 and 112 may be processed. Below the calculated threshold frequency 308, phase values of the second audio signal 112 may be used for phase values in the output signal 120. The amplitude of the output signal 120, for each frequency below the threshold frequency 308, may be the minimum of a spectral value of the first audio signal 106 and a spectral value of the second audio signal 112. For each frequency below the threshold frequency 308, the amplitude of the first and second audio signals 106 and 112 that has a low wind noise may be used as the amplitude in the output signal 120. For example, if a particular frequency below the threshold frequency 308 has substantially no wind noise, the amplitude of the first audio signal 106 may be used as the amplitude in the output signal 120 for that particular frequency. The first audio signal 106 may be used because the directional microphone 104 has a higher directivity index and a higher quality signal.

The signal processor 118 may include a delay unit 306. The delay unit 306 may keep the threshold frequency 308 constant for a predetermined time period if a change in the threshold frequency 308 is about to occur. The delay for the predetermined time period may be desirable to minimize artifacts in the output signal 120 that may be caused by abrupt changes in the threshold frequency 308. For example, the threshold frequency 308 may be at a first frequency and moving to a second frequency. In this state, the delay unit 306 may maintain the threshold frequency 308 at the first frequency for a predetermined time period before changing to the second frequency.

Figure 4:
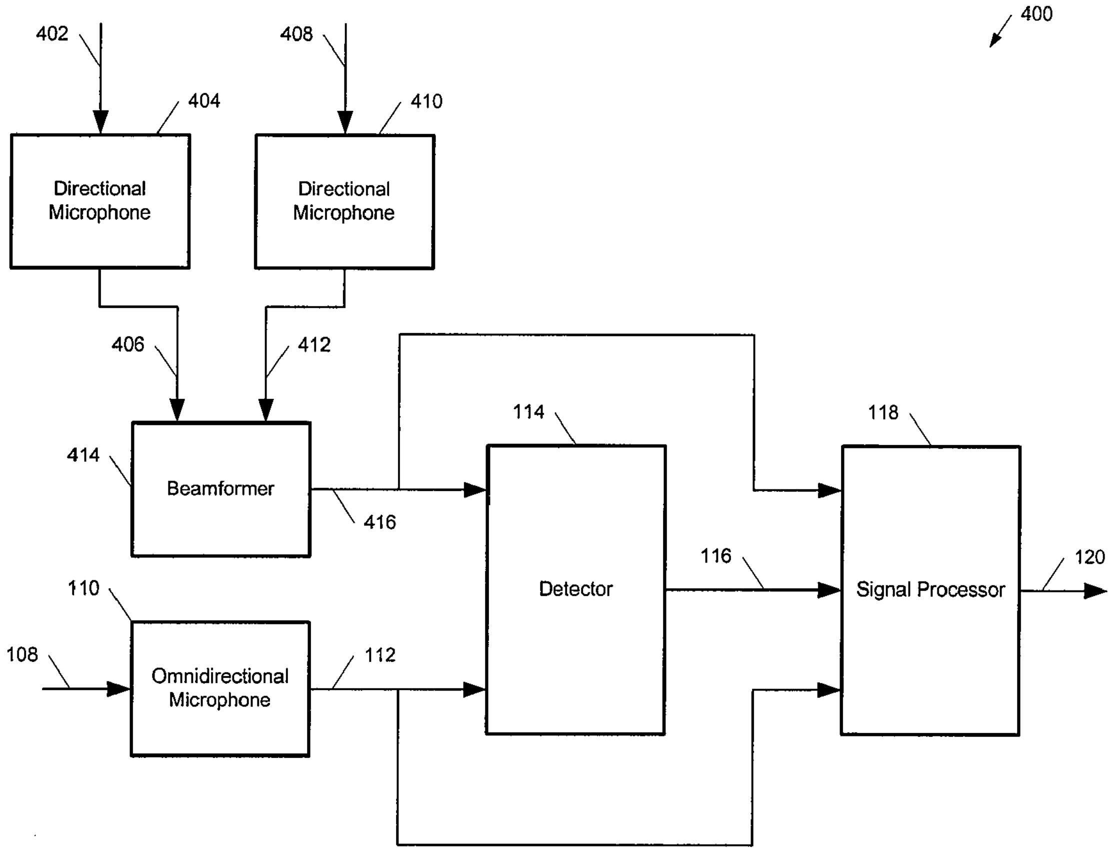
FIG. 4 is an alternative wind noise suppression system.

FIG. 4 is an alternative wind noise suppression system 400. The wind noise suppression system 400 may detect sounds through multiple transducers, detect the presence of wind noise in the audio signals corresponding to the sounds, and generate an output signal including one or a combination of the audio signals. A first sound 402 may be detected by a first directional microphone 404 and converted to a first directional audio signal 406. A second sound 408 may be detected by a second directional microphone 410 and converted to a second directional audio signal 412. The system 400 may use the first and second directional microphones 404 and 410 to improve the quality of the output signal using beamforming. Beamforming of multiple directional microphones may exploit differential spatial characteristics of the sounds 402 and 408 detected from the environment to suppress background or ambient noise. The system 400 may include more than two directional microphones. A beamformer 414 may receive the first and second directional audio signals 406 and 412. The beamformer 414 may generate a beamformed audio signal 416 that is a combination of the received signals 406 and 412 with an increased signal-to-noise ratio. The beamformed audio signal 416 may be used by the detector 114 in a similar way as the first audio signal 106 described in FIG. 1. A delay-and-sum beamformer, a Griffiths-Jim beamformer with adaptive filtering, and/or other type of beamformer may be used as the beamformer 414, for example.

A second sound 108 may be detected by an omnidirectional microphone 110 and converted to a second audio signal 112. The directional microphones 404 and 410 and omnidirectional microphone 110 may have different directivity indices. In particular, the directional microphones 404 and 410 may substantially detect sound originating from a direction, have a non-zero directivity index of approximately 4.8 dB, and have a cardioid or dipole polar sensitivity pattern. The omnidirectional microphone 110 may have a directivity index of approximately 0 dB and have a circular polar sensitivity pattern. The omnidirectional microphone 110 may be relatively insensitive to wind noise compared to the directional microphones 404 and 410. The directional microphones 404 and 410 and the omnidirectional microphone 110 may be physically coupled within a common housing or may be positioned apart in separate housings.

The beamformed and second audio signals 416 and 112 may have a first and second power level, respectively. A detector 114 may compare the first and second power levels and generate a detection signal 116. If the second power level is less than the first power level by a predetermined value, the detection signal 116 may indicate presence of wind noise. If the second power level is not less than the first power level by the predetermined value, the detection signal 116 may indicate absence of wind noise. Wind noise may be present when the second audio signal of the omnidirectional microphone 110 has a lower power level than the first audio signal of the directional microphones 404 and 410 by the predetermined value. The predetermined value may be programmed and may be associated with a range where wind noise significantly deteriorates the beamformed and second audio signals 416 and 112. For example, the predetermined value may be close to zero, such that the detection signal 116 indicates the presence of wind noise if the second power level is less than the first power level.

The signal processor 118 may generate an output signal 120 based on the detection signal 116. The output signal 120 may be generated from the beamformed audio signal 416, the second audio signal 112, or a combination of the beamformed and second audio signals 416 and 112. If the detection signal 116 indicates the presence of wind noise, the output signal 120 may be generated from the second audio signal 112 detected by the omnidirectional microphone 110. The output signal 120 may include the second audio signal 112 because the beamformed audio signal 416 may be deteriorated by wind noise. However, if the detection signal 116 indicates the absence of wind noise, the output signal 120 may be generated from the beamformed audio signal 416 detected by the directional microphones 404 and 410. The output signal 120 may include the beamformed audio signal 416 because the directional microphones 404 and 410 may have higher quality signals due to their higher directivity indices.

Alternatively, the signal processor 118 may generate the output signal 120 from a combination of the beamformed and second audio signals 416 and 112, based on a predetermined or programmed frequency. If the detection signal 116 indicates the presence of wind noise, the output signal 120 may include a portion of the beamformed audio signal 416 that is above the predetermined or programmed frequency and a portion of the second audio signal 112 that is below the predetermined or programmed frequency. The output signal 120 may include higher frequencies from the directional microphones 404 and 410, and lower frequencies from the omnidirectional microphone 110. The predetermined or programmed frequency may be approximately 500 Hz, for example, or may be another frequency. In another alternative, the signal processor 118 may generate the output signal 120 from a combination of the beamformed and second audio signals 416 and 112, based on a calculated threshold frequency. If the detection signal 116 indicates the presence of wind noise, the output signal 120 may include a portion of the beamformed audio signal 414 that is above the threshold frequency and a portion of the second audio signal 112 that is below the threshold frequency. The threshold frequency may be calculated based on the first and second power levels of the beamformed and second audio signals 416 and 112.

Figure 5:
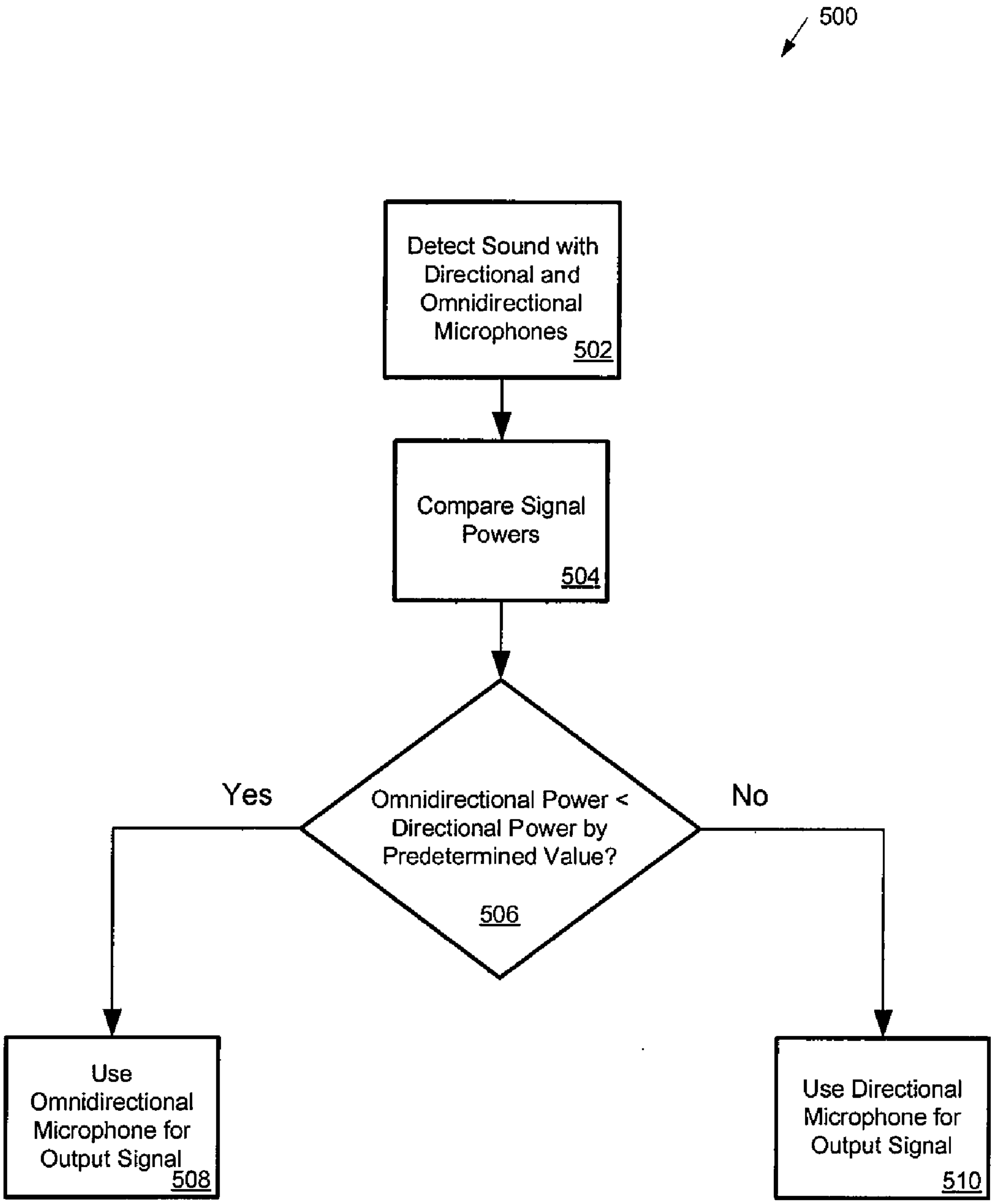
FIG. 5 is a process that detects the presence of wind noise.

FIG. 5 is a process 500 that detects the presence of wind noise. The process 500 results in the generation of an output signal from an audio signal of an omnidirectional microphone or a directional microphone. At Act 502, a directional microphone and an omnidirectional microphone may each detect sound. The sound may originate in the environment, and may be speech, voice, music, wind noise, vibrations, or any other sound. The directional microphone and the omnidirectional microphone may have different directivity indices. In particular, the directional microphone may substantially detect sound originating from a specific direction, and the omnidirectional microphone may detect sound originating from many directions. More than one directional or omnidirectional microphone or other types of microphones may be used to detect sound in Act 502. A beamformer may also be used to combine audio signals received through multiple microphones. The sound detected at each microphone may be converted to audio signals with respective power levels.

At Act 504, the power levels of each audio signal may be compared. The comparison may indicate whether wind noise is present in the sounds detected by the microphones in Act 502. A circuit for performing amplitude selection between either two variables or between a variable and a constant may carry out the comparison. At Act 506, if the power level of the omnidirectional microphone audio signal is less than the power level of the directional microphone audio signal by a predetermined value, then the process 500 continues to Act 508. At Act 508, the generated output signal may select the audio signal corresponding to the omnidirectional microphone. At this Act, wind noise is detected, and the output signal comprises the audio signal from the omnidirectional microphone due to its greater robustness to wind noise, in comparison to a directional microphone. However, at Act 506, if the power level of the omnidirectional microphone audio signal is equal to or greater than the power level of the directional microphone audio signal by the predetermined value, then the process 500 continues to Act 510. At Act 510, the generated output signal may comprise the audio signal corresponding to the directional microphone. The output signal may include the audio signal from the directional microphone because the directional microphone has a higher quality signal due to its higher directivity index.

Figure 6:
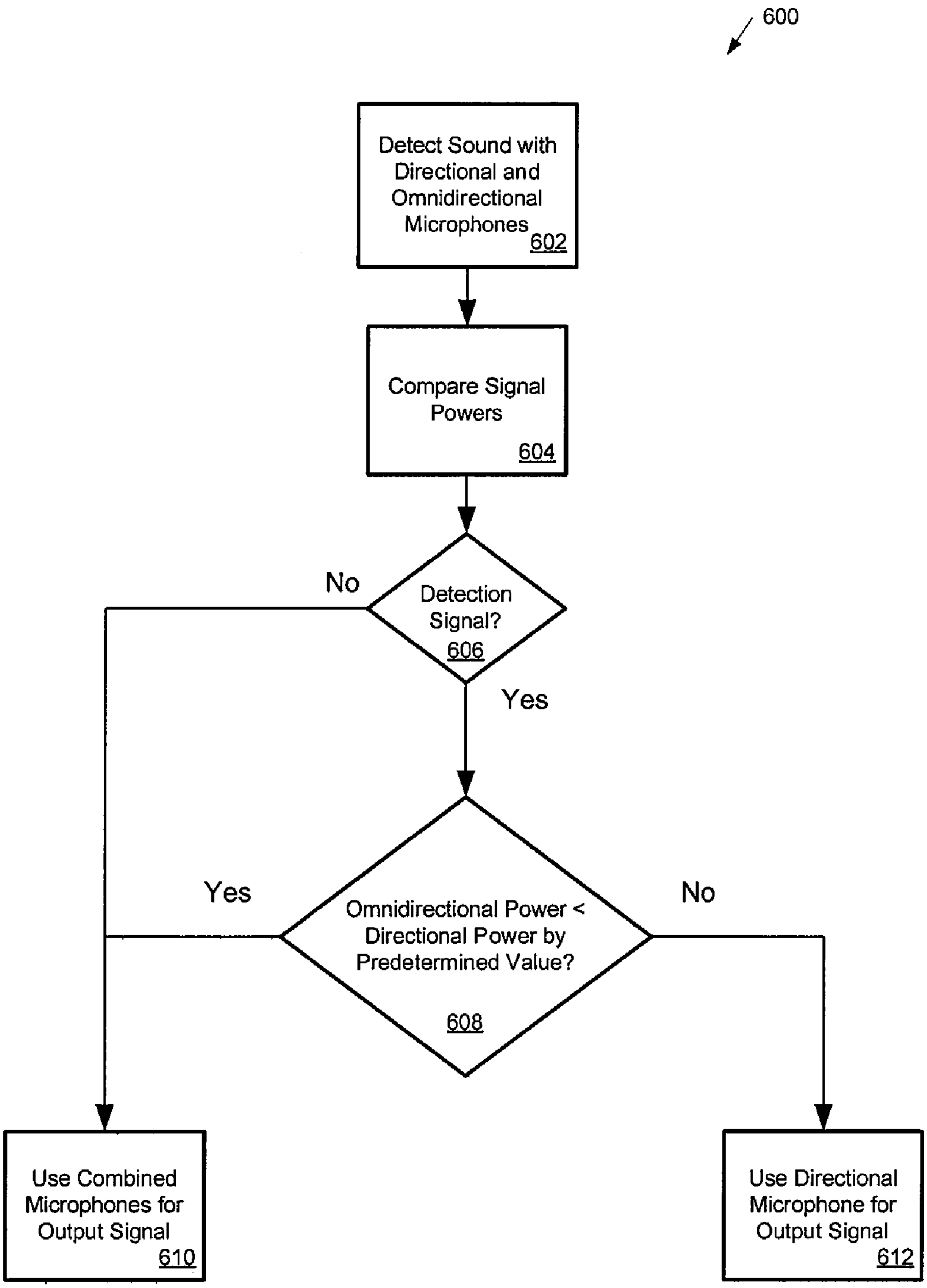
FIG. 6 is a first alternative process that detects the presence of wind noise.

FIG. 6 is a first alternative process 600 that detects the presence of wind noise. The process 600 results in the generation of an output signal using an audio signal from a directional microphone or a combination of audio signals from the directional microphone and an omnidirectional microphone. At Act 602, the directional microphone and the omnidirectional microphone may each detect sound. The directional microphone and the omnidirectional microphone may have different directivity indices. More than one directional or omnidirectional microphone or other types of microphones may be used to detect sound in Act 602. A beamformer may also be used to combine audio signals on multiple microphones. The sound detected at each microphone may be converted into audio signals with respective power levels. At Act 604, the power levels of each audio signal may be compared. The comparison may indicate whether wind noise is present in the detected sounds in Act 602. Act 606 determines whether a detection signal was generated from the comparison in Act 602. A detection signal may not be generated if, for example, there has been no change in the detected sound in Act 602. If a detection signal was not generated, the process 600 continues at Act 610. At Act 610, the output signal may be generated from a combination of the omnidirectional and directional microphones. For example, the output signal may include a portion of the directional audio signal that is above a predetermined frequency, and a portion of the omnidirectional audio signal that is below the predetermined frequency. The predetermined frequency may be approximately 500 Hz, for example, or may be another frequency.

However, if the detection signal was generated in Act 606, the process 600 continues to Act 608. At Act 608, if the power level of the omnidirectional microphone audio signal is less than the power level of the directional microphone audio signal by a predetermined value, then the process 600 continues to Act 610. At Act 610, the output signal may be generated from a combination of the omnidirectional and directional microphones. If the power level of the omnidirectional microphone audio signal is not less than the power level of the directional microphone audio signal by a predetermined value, the process 600 continues to Act 612. At Act 612, the output signal may use the audio signal corresponding to the directional microphone. The output signal may include the directional microphone audio signal when the directional microphone has a higher directivity index.

Figure 7:
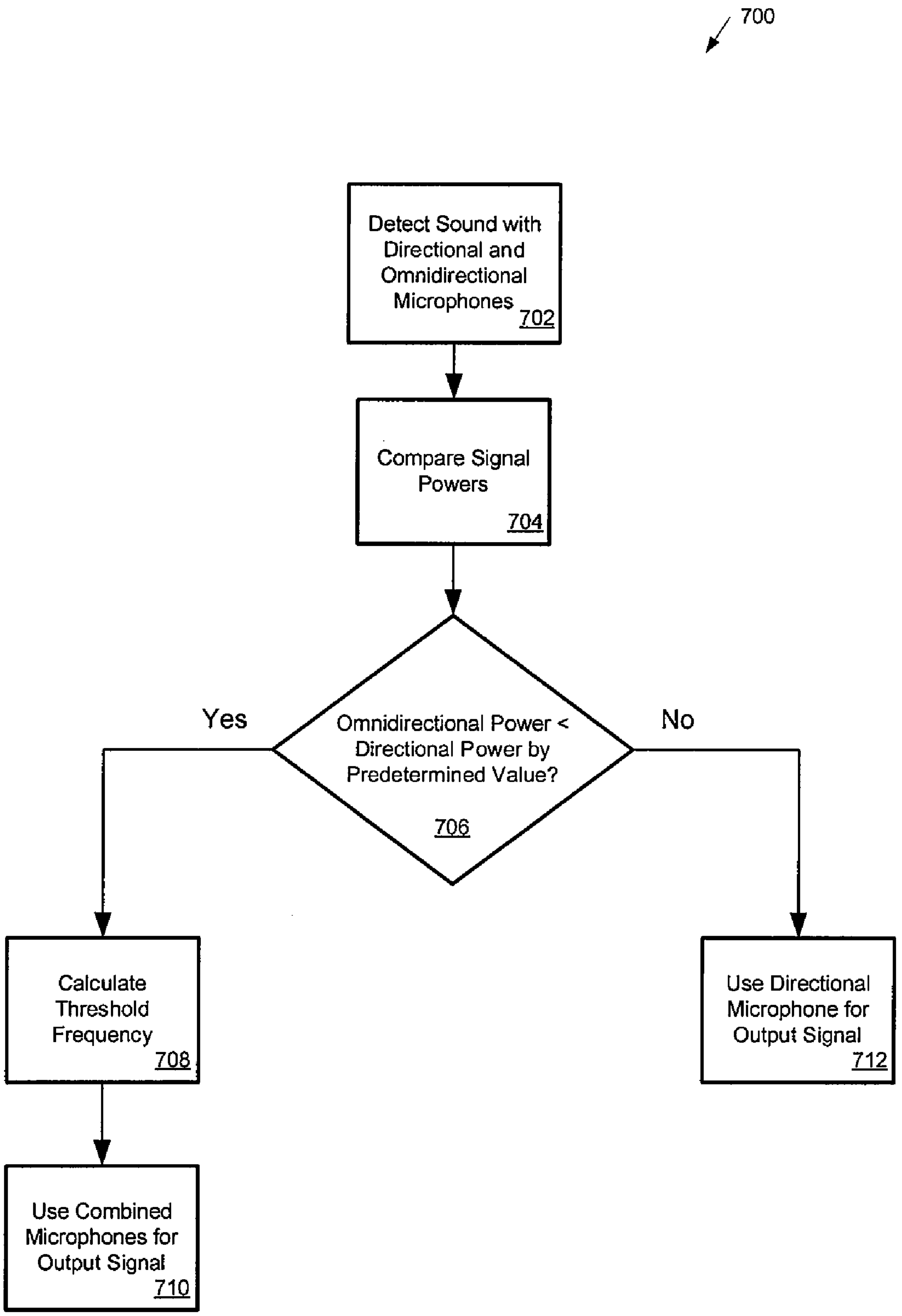
FIG. 7 is a second alternative process that detects the presence of wind noise.

FIG. 7 is a second alternative process 700 that detects the presence of wind noise. The process 700 results in the generation of an output signal using an audio signal from a directional microphone or a combination of the directional microphone and an omnidirectional microphone. At Act 702, a directional microphone and an omnidirectional microphone may detect sound. More than one directional or omnidirectional microphone or other microphones may be used to detect sound in Act 702. A beamformer may combine audio signals received through multiple microphones. The sound detected at each microphone may be converted to audio signals with respective power levels. At Act 704, the power levels of each audio signal may be compared. The comparison may indicate whether wind noise is present in the sounds detected by the microphones in Act 702.

At Act 706, if the power level of the omnidirectional microphone audio signal is less than the power level of the directional microphone audio signal by a predetermined value, then the process 700 continues to Act 708. At Act 708, a threshold frequency may be calculated, based on the power levels of the audio signals detected in Act 702. The threshold frequency may be calculated such that the power level from the omnidirectional microphone is not less than the power level from the directional microphone by a predetermined value, for frequencies above the threshold frequency. The threshold frequency may be calculated to be within a range of approximately 500 Hz to approximately 1000 Hz, for example. The calculation of the threshold frequency may be time-dependent and change dynamically, depending on the audio signals detected in Act 702.

At Act 710, the higher quality audio signal from the directional microphone may be used in the output signal for frequencies above the threshold frequency. In these higher frequencies, wind noise may have less effect and the higher directivity index directional microphone may be used. Similarly, the audio signal from the omnidirectional microphone may be used in the output signal for frequencies below the threshold frequency. Because wind noise may be more noticeable at lower frequencies, the lower directivity index omnidirectional microphone may be used. The phase and amplitude value of the audio signals may also be analyzed and used to generate the output signal in frequencies below the threshold frequency. For example, complex spectrograms of the audio signals may be processed. Below the threshold frequency calculated in Act 708, phase values of the audio signal from the omnidirectional microphone may be used for phase values in the output signal. The amplitude of the output signal may be the minimum of a spectral value of the audio signals, for each frequency below the threshold frequency. For each frequency below the threshold frequency, the amplitude of the audio signal with less wind noise may be used or selected as the amplitude in the output signal. If a particular frequency below the threshold frequency has substantially no wind noise, the amplitude of the audio signal from the directional microphone may be used as the amplitude in the output signal for that particular frequency.

At Act 706, if the power level of the omnidirectional microphone audio signal is not less than the power level of the directional microphone audio signal by a predetermined value, then the process 700 continues. At Act 712, the generated output signal may use the audio signal corresponding to the directional microphone. The output signal may include the audio signal from the directional microphone when the directional microphone has a higher directivity index.

Each of the processes described may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logical functions. A logical function or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as code or an image or in another format (e.g., through an optical scan), then compiled, and/or interpreted or otherwise processed. The processed medium may then be stored in a computer and/or machine memory.

Although selected aspects, features, or components of the implementations are depicted as being stored in memories, all or part of the systems, including processes and/or instructions for performing processes, consistent with detection and suppression of wind noise in microphone signals may be stored on, distributed across, or read from other machine-readable media, for example, secondary storage devices such as distributed hard disks, floppy disks, and CD-ROMs; a signal received from a network; or other forms of ROM or RAM, some of which may be written to and read from within a vehicle.

Specific components of a system implementing detection and suppression of wind noise in microphone signals may include additional or different components. A controller may be implemented as a microprocessor, microcontroller, application specific integrated circuit (ASIC), discrete logic, or a combination of other types of circuits or logic. Similarly, memories may comprise DRAM, SRAM, Flash, or other types of memory. Parameters (e.g., conditions), databases, and other data structures may be distributed across platforms or devices, separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system, comprising: a first transducer with a first directivity index and configured to detect a first audio signal, where the first directivity index is non-zero and the first audio signal has a first power level; a second transducer with a second directivity index and configured to detect a second audio signal, where the second directivity index is less than the first directivity index and the second audio signal has a second power level; to a detector configured to output a detection signal based on a comparison of the first power level and the second power level, the detection signal indicating presence of wind noise if the second power level is less than the first power level by a predetermined value, and indicating absence of wind noise if the second power level is not less than the first power level by the predetermined value; and a signal processor configured to output an output signal from the first audio signal, the second audio signal, or combinations thereof, based on the detection signal where the output signal is generated from a combination of the first audio signal and the second audio signal if the detection signal indicates the presence of wind noise or the detection signal is not output, the combination comprising a portion of the first audio signal above a predetermined frequency and a portion of the second audio signal below the predetermined frequency.

2. The system of claim 1, where the output signal is generated from the first audio signal if the detection signal indicates the absence of wind noise.

3. The system of claim 1, where the output signal is generated from the second audio signal if the detection signal indicates the presence of wind noise.

4. The system of claim 1, further comprising a beamformer configured to output the first audio signal with the first power level based on a combination of audio signals from each of a plurality of transducers, the plurality of transducers each having a directivity index greater than the second directivity index.

5. The system of claim 1, further comprising a delay module configured to keep the detection signal constant for a first predetermined time period and the threshold frequency constant for a second predetermined time period.

6. The system of claim 1, where the detector comp rises a comparator for comparing the first power level and the second power level, and a selector for allowing selection of the predetermined value.

7. The system of claim 1, where the system is in communication with a vehicle.

8. A system, comprising: a first transducer with a first directivity index and configured to detect a first audio signal, where the first directivity index is non-zero and the first audio signal has a first power level; a second transducer with a second directivity index and configured to detect asecond audio signal, where the second directivity index is less than the first directivity index and the second audio signal has a second power level; to a detector configured to output a detection signal based on a comparison of the first power level and the second power level, the detection signal indicating presence of wind noise if the second power level is less than the first power level by a predetermined value, and indicating absence of wind noise if the second power level is not less than the first power level by the predetermined value; and a signal processor configured to output an output signal from the first audio signal, the second audio signal, or combinations thereof, based on the detection signal, where the signal processor comprises a threshold frequency calculator configured to calculate a threshold frequency based on the first power level and the second power level, the threshold frequency calculated such that the second power level is not less than the first power level by the predetermined value in frequencies above the threshold frequency.

9. The system of claim 8, where the output signal is generated from a combination of the first audio signal for frequencies above the threshold frequency and the second audio signal for frequencies below the threshold frequency, if the detection signal indicates the presence of wind noise, the combination comprising phase values of the second audio signal and amplitude values of the first audio signal and the second audio signal.

10. The system of claim 9, where the amplitude values comp rise a minimum of a to spectral value of the first audio signal and a spectral value of the second audio signal, for each frequency below the threshold frequency.

11. A signal processing method performed on a signal processing system, comprising: detecting a first audio signal with a first power level, the first audio signal originating from a specific direction; detecting a second audio signal with a second power level, the second audio signal originating from any direction; comparing the first and second power levels within a detector; outputting a detection signal from the detector indicating presence of wind noise when the second power level is less than the first power level by a predetermined value, or absence of wind noise when the second power level is not less than the first power level by the predetermined value; and generating an output signal within a signal processor from the first audio signal, the second audio signal, or combinations thereof, based on the detection signal where the output signal is generated from a combination of the first audio signal and the second audio signal when the detection signal indicates the presence of wind noise or the detection signal is not output, the combination comprising a portion of the first audio signal above a predetermined frequency and a portion of the second audio signal below the predetermined frequency.

12. The method of claim 11, where the output signal is generated from the first audio signal when the detection signal indicates the absence of wind noise.

13. The method of claim 11, where the output signal is generated from the second audio signal when the detection signal indicates the presence of wind noise.

14. The method of claim 11, further comprising beamforming a plurality of audio signals originating from a plurality of specific directions to generate the first audio signal with the first power level.

15. The method of claim 11, further comprising keeping the detection signal constant for a first predetermined time period and keeping the threshold frequency substantially constant for a second predetermined time period.

16. A signal processing method performed on a signal processing system, comprising: detecting a first audio signal with a first power level, the first audio signal originating from a specific direction; detecting a second audio signal with a second power level, the second audio signal originating from any direction; comparing the first and second power levels within a detector; outputting a detection signal from the detector indicating presence of wind noise when the second power level is less than the first power level by a predetermined value, or absence of wind noise when the second power level is not less than the first power level by the predetermined value; generating an output signal within a signal processor from the first audio signal, the second audio signal, or combinations thereof, based on the detection signal calculating a threshold frequency based on the first power level and the second power level, the threshold frequency calculated such that the second power level is not less than the first power level by the predetermined value in frequencies above the threshold frequency.

17. The method of claim 16, where the output signal is generated from a combination of the first audio signal and the second audio signal for frequencies below the threshold frequency if the detection signal indicates the presence of wind noise, the combination comprising phase values of the second audio signal and amplitude values of the first audio signal and the second audio signal.

18. The method of claim 17, where the amplitude values comp rise a minimum of a spectral value of the first audio signal and a spectral value of the second audio signal, for each frequency below the threshold frequency.

19. A system, comprising: a first transducer configured to detect a first audio signal originating from a specific direction, where the first audio signal has a first power level; a second transducer configured to detect a second audio signal originating from a second direction, where the second audio signal has a second power level; a comparator configured to output a detection signal based on a comparison of the first power level and the second power level, the detection signal indicating presence of wind noise if the second power level is less than the first power level by a predetermined value, and indicating absence of wind noise if the second power level is not less than the first power level by the predetermined value; and an output signal generator configured to generate an output signal from the first audio signal, if the detection signal indicates the absence of wind noise, and from the second audio signal, if the detection signal indicates the presence of wind noise; where the output signal generator is further configured to generate the output signal from a combination of the first and second audio signals, when the detection signal indicates the presence of wind noise, or if the comparator does not output the detection signal and where the combination comprises a portion of the first audio signal above a predetermined frequency and a portion of the second audio signal below the predetermined frequency.

20. The system of claim 19, further comprising a beamformer configured to output the first audio signal with the first power level, the first audio signal comprising audio signals originating from specific directions, each of the audio signals provided by each of a plurality of transducers.

21. A system, comprising: a first transducer configured to detect a first audio signal originating from a specific direction, where the first audio signal has a first power level; a second transducer configured to detect a second audio signal originating from a second direction, where the second audio signal has a second power level; a comparator configured to output a detection signal based on a comparison of the first power level and the second power level, the detection signal indicating presence of wind noise if the second power level is less than the first power level by a predetermined value, and indicating absence of wind noise if the second power level is not less than the first power level by the predetermined value; and an output signal generator configured to generate an output signal from the first audio signal, if the detection signal indicates the absence of wind noise, and from the second audio signal, if the detection signal indicates the presence of wind noise a threshold frequency calculator configured to calculate a threshold frequency, and where the output signal generator is further configured to generate the output signal from a combination of the first and second audio signals, the combination comprising a portion of the first audio signal above the threshold frequency and a portion of the second audio signal below the threshold frequency.

* * * * *